US009259682B2

United States Patent
Bergh et al.

(10) Patent No.: US 9,259,682 B2
(45) Date of Patent: Feb. 16, 2016

(54) HEAT OF COMPRESSION DRYER SYSTEM

(71) Applicant: Ingersoll-Rand Company, Davidson, NC (US)

(72) Inventors: Charles John Bergh, Berwyn, PA (US); Henry Y Mark, West Chester, PA (US)

(73) Assignee: Ingersoll-Rand Company, Davidson, NC (US)

( * ) Notice: Subject to any disclaimer, the term of this patent is extended or adjusted under 35 U.S.C. 154(b) by 92 days.

(21) Appl. No.: 14/295,782

(22) Filed: Jun. 4, 2014

(65) Prior Publication Data

US 2014/0360364 A1    Dec. 11, 2014

Related U.S. Application Data

(60) Provisional application No. 61/831,458, filed on Jun. 5, 2013.

(51) Int. Cl.
*B01D 53/26* (2006.01)
*B01D 53/04* (2006.01)

(52) U.S. Cl.
CPC .......... *B01D 53/261* (2013.01); *B01D 53/0462* (2013.01); *B01D 53/265* (2013.01); *B01D 2253/104* (2013.01); *B01D 2253/106* (2013.01); *B01D 2259/402* (2013.01); *B01D 2259/4009* (2013.01)

(58) Field of Classification Search
CPC ............. B01D 53/0462; B01D 53/261; B01D 53/265; B01D 2253/104; B01D 2253/106; B01D 2259/4009; B01D 2259/402
USPC ................... 95/114, 115, 117, 148, 123, 124; 96/121, 122, 128, 130, 131, 144; 34/472, 473, 80
See application file for complete search history.

(56) References Cited

U.S. PATENT DOCUMENTS 4,783,432 A * 11/1988 Settlemyer ........... B01D 53/261
                                                502/34
4,971,610 A * 11/1990 Henderson .......... B01D 53/261
                                                96/111

(Continued)

FOREIGN PATENT DOCUMENTS

JP        2006192401        7/2006

OTHER PUBLICATIONS

Pneumatech Inc., Heat of Compression, Section 20, Bulletin A-10-HC.

*Primary Examiner* — Frank Lawrence
(74) *Attorney, Agent, or Firm* — Taft Stettnius & Hollister, LLP

(57) ABSTRACT

A gas compressing system includes a compressor that provides a flow of compressed gas, a first desiccant tower, and a second desiccant tower separate from the first tower. The system also includes a first separator, a second separator separate from the first separator, an outlet, a first set and second set of no more than three valves each movable between an open position and a closed position. The flow flows along a flow path from the compressor to the first tower, to the first separator, to the second tower and out the outlet when the first set of valves is open and the second set of valves is closed. The flow of compressed gas flows from the compressor to the second tower, to the second separator, to the first tower and out the outlet when the first set of valves is closed and the second set of valves is opened.

29 Claims, 8 Drawing Sheets

(56) References Cited

U.S. PATENT DOCUMENTS

| | | | | |
|---|---|---|---|---|
| 5,234,479 A | * | 8/1993 | Henderson | B01D 53/261 95/105 |
| 5,658,369 A | * | 8/1997 | Kusay | B01D 53/0476 95/106 |
| 6,171,377 B1 | * | 1/2001 | Henderson | B01D 53/04 96/122 |
| 6,375,722 B1 | * | 4/2002 | Henderson | B01D 53/0454 96/112 |
| RE39,122 E | | 6/2006 | Henderson et al. | |
| 7,922,790 B2 | * | 4/2011 | Vertriest | B01D 53/261 55/DIG. 17 |
| 2010/0212505 A1 | | 8/2010 | Walker et al. | |

* cited by examiner

HEAT OF COMPRESSION DRYER SYSTEM

RELATED APPLICATION DATA

This application claims priority to U.S. Provisional Application No. 61/831,458 filed Jun. 5, 2013, the entire contents of which are incorporated herein by reference.

BACKGROUND

The present invention relates to a compressed gas dryer that uses the heat of compression to dry the compressed gas, and more particularly to a compressed air dryer that includes redundant dryer towers that use the heat of compression to dry the air.

Heat of compression dryer systems employ a drying compound that interacts with the gas being dried to remove moisture from the flow. Periodically, the system must be taken off line and recharged.

SUMMARY

In one embodiment, the invention provides a heat of compression dryer system that includes two desiccant towers and no more than ten valves arranged to allow for the regeneration of one tower while the second tower dries a flow of compressed gas. The arrangement assures that the flow of compressed gas passes through no more than three valves during any mode of operation.

In one construction, the invention provides a gas compressing system that includes a compressor operable to provide a flow of compressed gas and water vapor at a first high temperature, a first desiccant tower including a first quantity of desiccant, and a second desiccant tower separate from the first desiccant tower and including a second quantity of desiccant. The system also includes a first moisture separator, a second moisture separator separate from the first moisture separator, a dry gas outlet, a first set of no more than three valves each movable between an open position and a closed position, and a second set of no more than three valves each movable between an open position and a closed position. The flow of compressed gas and water vapor flows along a flow path, in order from the compressor to the first desiccant tower, to the first moisture separator, to the second desiccant tower and out the dry gas outlet when each of the valves of the first set of valves is open and each valve of the second set of valves is closed. The flow of compressed gas and water vapor flows, in order from the compressor to the second desiccant tower, to the second moisture separator, to the first desiccant tower and out the dry gas outlet when each of the valves of the first set of valves is closed and each valve of the second set of valves is opened.

In another construction, the invention provides a gas compressing system that includes a compressor operable to provide a flow of compressed gas and water vapor, a first desiccant tower including a first inlet, a first outlet, and a first quantity of desiccant positioned in a first flow path between the first inlet and the first outlet, and a second desiccant tower including a second inlet, a second outlet, and a second quantity of desiccant positioned in a second flow path between the second inlet and the second outlet. The system also includes a first moisture separator, a second moisture separator, a dry gas outlet, a first set of three and only three valves each movable between an open position and a closed position, and a second set of three and only three valves each movable between an open position and a closed position. In a first arrangement, each of the valves of the first set of valves is open and each of the valves of the second set of valves is closed and the flow of compressed gas and vapor flows along a system flow path from the compressor, through the first desiccant tower to heat and regenerate the desiccant, then through the first moisture separator to remove a portion of the water vapor, then through the second desiccant tower to remove additional water vapor, then through the dry gas outlet. In a second arrangement, each of the valves of the first set of valves is closed and each of the valves of the second set of valves is open and the flow of compressed gas and vapor flows from the compressor, through the second desiccant tower to heat and regenerate the desiccant, then through the second moisture separator to remove a portion of the water vapor, then through the first desiccant tower to remove additional water vapor, then through the dry gas outlet.

In yet another construction, the invention provides a method of providing dry compressed gas at a dry gas outlet. The method includes providing a first desiccant tower and a second desiccant tower, each tower including an inlet and an outlet, compressing a quantity of gas to produce a flow of compressed gas and water vapor at a high temperature, and passing the flow of compressed gas and water vapor along a flow path through the first desiccant tower from the outlet to the inlet to cool the flow of compressed gas and water vapor. The invention also includes regenerating the desiccant in the first desiccant tower as the flow of compressed gas and water vapor passes therethrough, passing the flow of compressed gas and water vapor through the second desiccant tower from the inlet to the outlet, the desiccant adsorbing a portion of the water vapor from the flow of compressed gas and water vapor, and directing the flow of compressed gas and water vapor from the outlet of the second desiccant tower to the dry gas outlet. The method further includes periodically transitioning a first group of no more than three valves from an open position to a closed position and a second group of no more than three valves from a closed position to an open position to redirect the flow of compressed gas and water vapor from the compressor to the outlet of the second desiccant tower to regenerate the second desiccant tower, from the inlet of the second desiccant tower to the inlet of the first desiccant tower to remove a portion of the water vapor from the flow of compressed gas and water vapor, and from the outlet of the first desiccant tower to the dry gas outlet.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

It should be noted that the invention will be described as it applies to an air compression system 10. However, one of ordinary skill in the art will realize that the invention should not be limited to air compression systems 10 alone. Rather, the system is applicable to many other systems that compress gases other than air. In addition, the system operates to deliver a flow of dry compressed gas. As one of ordinary skill in the art will realize, "dry" compressed gas does not refer to a flow of compressed gas that includes no moisture. Rather, a flow of dry compressed gas is a flow that includes a quantity of moisture at a dew point well below a desired operating temperature such that the moisture does not condense out of the flow during use.

Figure 1:
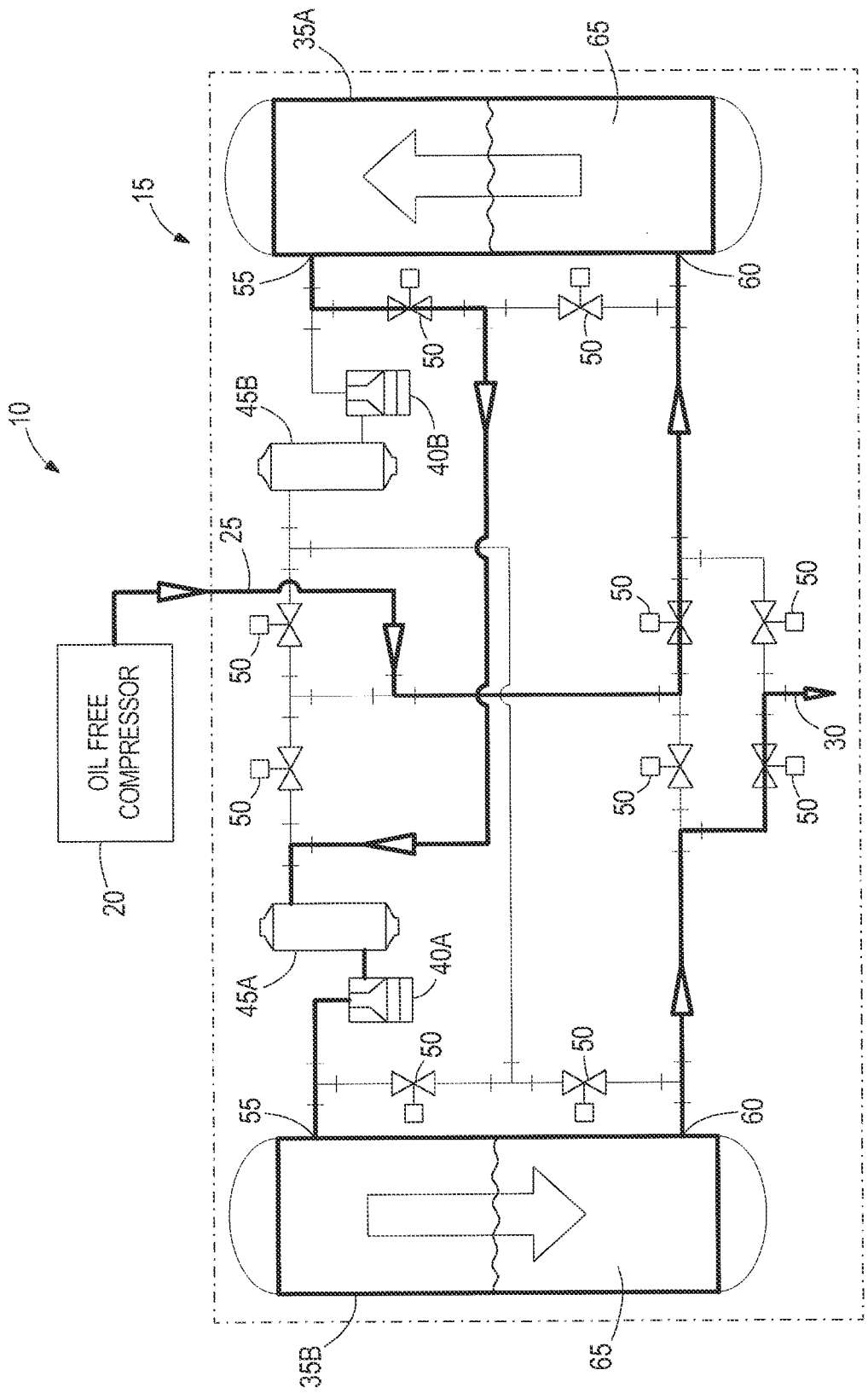
FIG. 1 is a schematic diagram of compressor system and a heat of compression dryer system in a first mode of operation.

FIG. 1 illustrates a heat of compression dryer system 15 that utilizes the heat of compression inherent in an adiabatic compression machine 20 to regenerate adsorptive drying media. While illustrated as an oil free compressor 20, other compression machines could include, a reciprocating compressor, a scroll compressor, a centrifugal compressor, or any other suitable compressor. The compression machine 20, or compressor, provides a flow of compressed gas 25 (air in the illustrated construction) that includes moisture. The dryer system 15 receives the flow of moist air from the compressor 20 and operates to discharge a flow of dry compressed air 30.

The dryer system 15, as illustrated in FIG. 1 includes two dryer towers 35, two separators 40, two coolers 45, ten valves 50, and piping that interconnects the various components. Each of the towers 35 includes an inlet 55, and outlet 60, and a quantity of desiccant 65 (e.g., silica gel, activated alumina, and the like) that absorbs or adsorbs moisture as the flow of compressed air passes through the desiccant 65 at the proper temperature. The selected desiccant 65 is such that when hot moist gas (at partial relative humidity) passes through the desiccant 65, the desiccant 65 releases moisture and is thereby recharged. When the moist compressed gas is cool, the desiccant adsorbs the moisture to dry the flow of compressed gas. The inlet 55 is the opening through which the compressed gas enters when the tower 35 is used in a drying mode and the outlet 60 is the opening through which the compressed gas exits when the tower 35 is used in a drying mode. In the illustrated construction, the inlet 55 is at the top of the tower 35 and the outlet 60 is near the bottom with other arrangements being possible.

Each of the coolers 45 is positioned to receive and cool a flow of compressed gas. In a preferred arrangement, the coolers 45 each include a heat exchanger that receives the flow of compressed gas as well as a flow of cooling fluid such as water, refrigerant, glycol, and the like. The cooling fluid used is selected based on the level of cooling required for the particular application. In one construction, a shell and tube heat exchanger uses a flow of cool water as the cooling fluid to cool the flow of compressed air entering the heat exchanger.

Each of the moisture separators 40 is positioned to receive the flow of compressed gas from one of the coolers 45 and is operable to separate a liquid portion of the moisture contained within the compressed gas stream. Several types of separators 40 could be employed including but not limited to coalescing filters, cyclonic separator, or other flow induced separators. In one form, the liquid portion is removed via a drain (not shown). In other embodiments, other means may be employed to remove the liquid portion.

Each of the valves 50 is selected for its particular purpose with many types of valves being suitable. For example, ball valves, butterfly valves, globe valves, gate valves, and the like could be employed. In addition, some or all of the valves 50 could be automatically controlled by an electronic or mechanical control system or could be manually actuated. Thus, one of ordinary skill in the art will realize that many different valves could be employed as desired. It should also be clear that as the number of valves 50 increases, the complexity and cost of the system increases. Therefore, it is a goal of the present system to use the minimum number of valves 50 to accomplish any desired operation. In addition, flow through a valve 50 causes a pressure drop that reduced the efficiency of the system 15. Thus, it is also a goal to minimize the number of valves 50 that the flow must pass through during operation.

In operation and as illustrated in FIG. 1, air is compressed by a compressor 20. During compression, moisture is compressed with the air and the compressed air is heated by the compression process. The hot, moist compressed air 25 (at partial relative humidity) enters the dryer system 15 and is directed to a first of the two towers 35A. The compressed air enters the tower 35A via the outlet 60 and flows through the tower 35A to the inlet 55. As the moist air flows through the desiccant 65, the desiccant 65 is heated to a temperature that allows the desiccant 65 to release the moisture that had been adsorbed. The flow then passes to one of the coolers 45a and is cooled. As the flow cools, moisture begins to condense from the flow. The flow then passes to the moisture separator 40a where the condensed moisture is separated from the flow.

The flow exits the separator 40a and enters the second tower 35B via the tower inlet 55. The flow passes through the second tower 35B where the desiccant 65 adsorbs additional moisture to further dry the flow of compressed air. The compressed air then exits the tower 35B and flows to a dryer outlet 70 and ultimately to a point of use.

Figure 2:
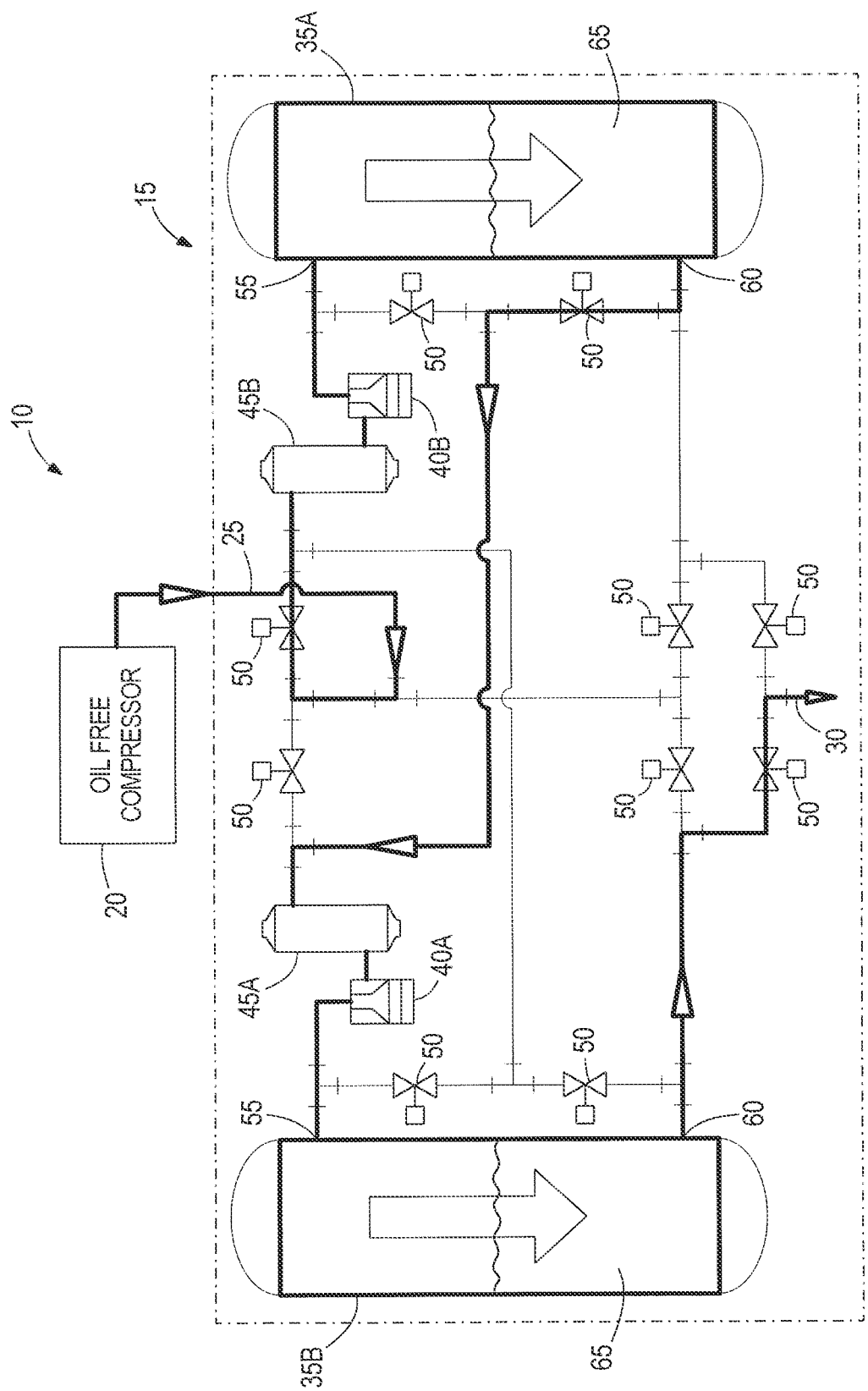
FIG. 2 is a schematic diagram of the compressor system and the heat of compression dryer system of FIG. 1 in a second mode of operation.

Eventually, the desiccant 65 of the second tower 35B becomes saturated and must be regenerated. Prior to that point, the first tower 35A is prepared to be used to adsorb moisture. During the regeneration phase, the desiccant 65 in the tower 35A being regenerated is heated by the compressed gas. To avoid a spike in the dew point of the compressed gas 30 discharged from the dryer system 15, the desiccant 65 in the regenerating tower 35A should be pre-cooled. FIG. 2 illustrates the dryer system 15 arranged to pre-cool the tower 35A at the end of the regeneration cycle. As illustrated in FIG. 2, the incoming moist compressed air 25 is first directed to a cooler 45B where the compressed air is cooled. The compressed air then flows through the moisture separator 40B where any condensed liquid is removed before being directed to the inlet 55 of the first tower 35A. The cool compressed gas entering the tower 35A is heated by the hot desiccant 65 and operates to cool the desiccant 65. Eventually, the flow of compressed gas cools the desiccant 65 to a desired temperature. The compressed gas exits the first tower 35A via the tower outlet 60 and flows to the other cooler 45A, separator 40A and tower 35B as described with regard to FIG. 1. Once the desiccant 65 in the first tower 35A reaches a predetermined temperature, the valves 50 are manipulated such that the flow of compressed air is the mirror image of the arrangement illustrated in FIG. 1. Thus, the second tower 35B enters a regeneration mode and the first tower 35A operates to dry the flow of compressed gas. The transitions described herein occur automatically and seamlessly such that there is no disruption in the flow of compressed gas and there is little or no change in the dew point of the compressed gas exiting the dryer system 15.

FIGS. 3-6 illustrate a dryer system 75 similar to that of FIGS. 1-2 with the addition of a heater 80 that can be used to more precisely control the temperature of the flow of compressed gas during various phases of operation. The heater 80 can be electrically powered or can include a heat exchanger that uses a hot fluid to heat the flow of compressed gas.

Figure 3:
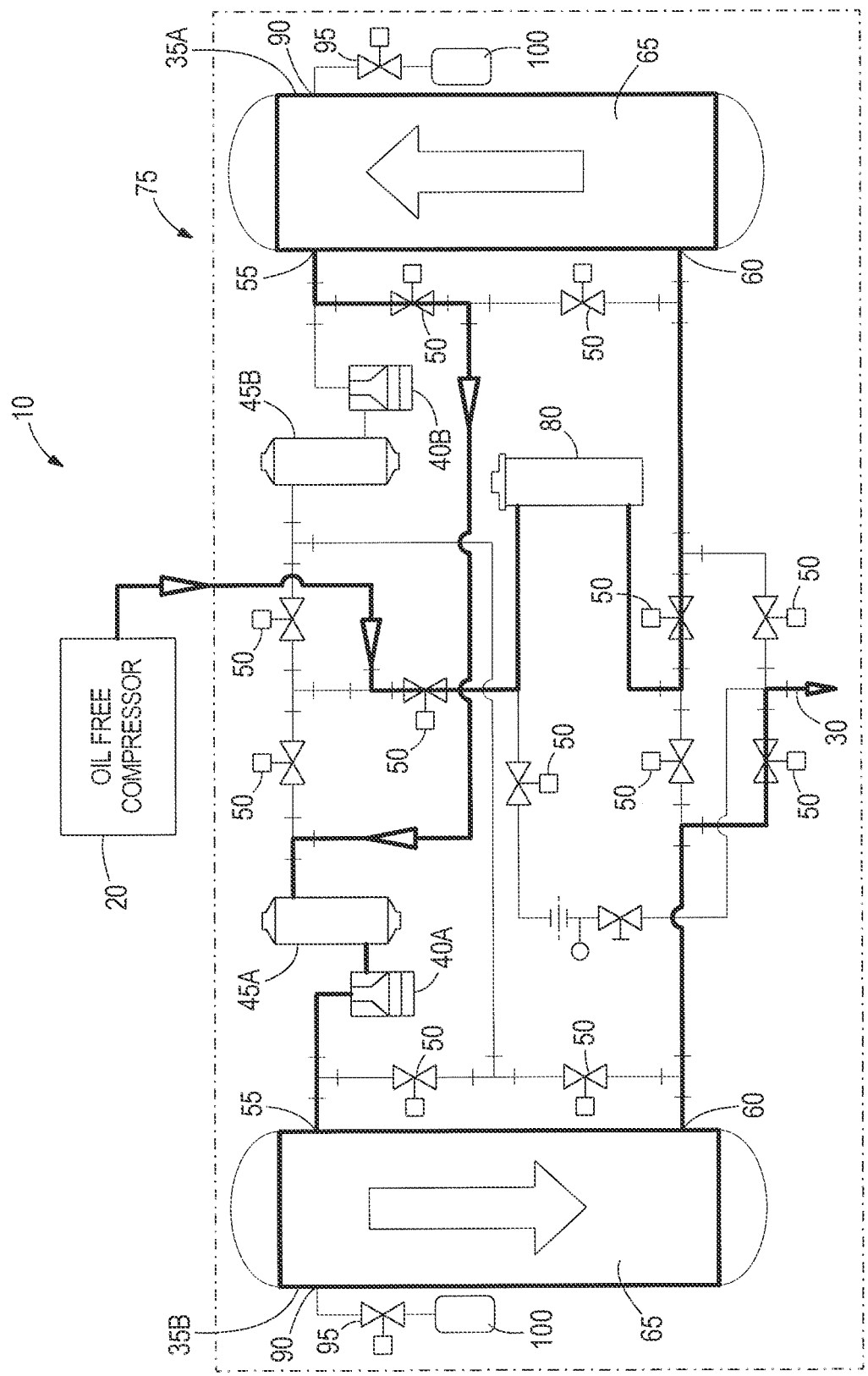
FIG. 3 is a schematic diagram of compressor system and a second heat of compression dryer system in a first mode of operation.
Figure 4:
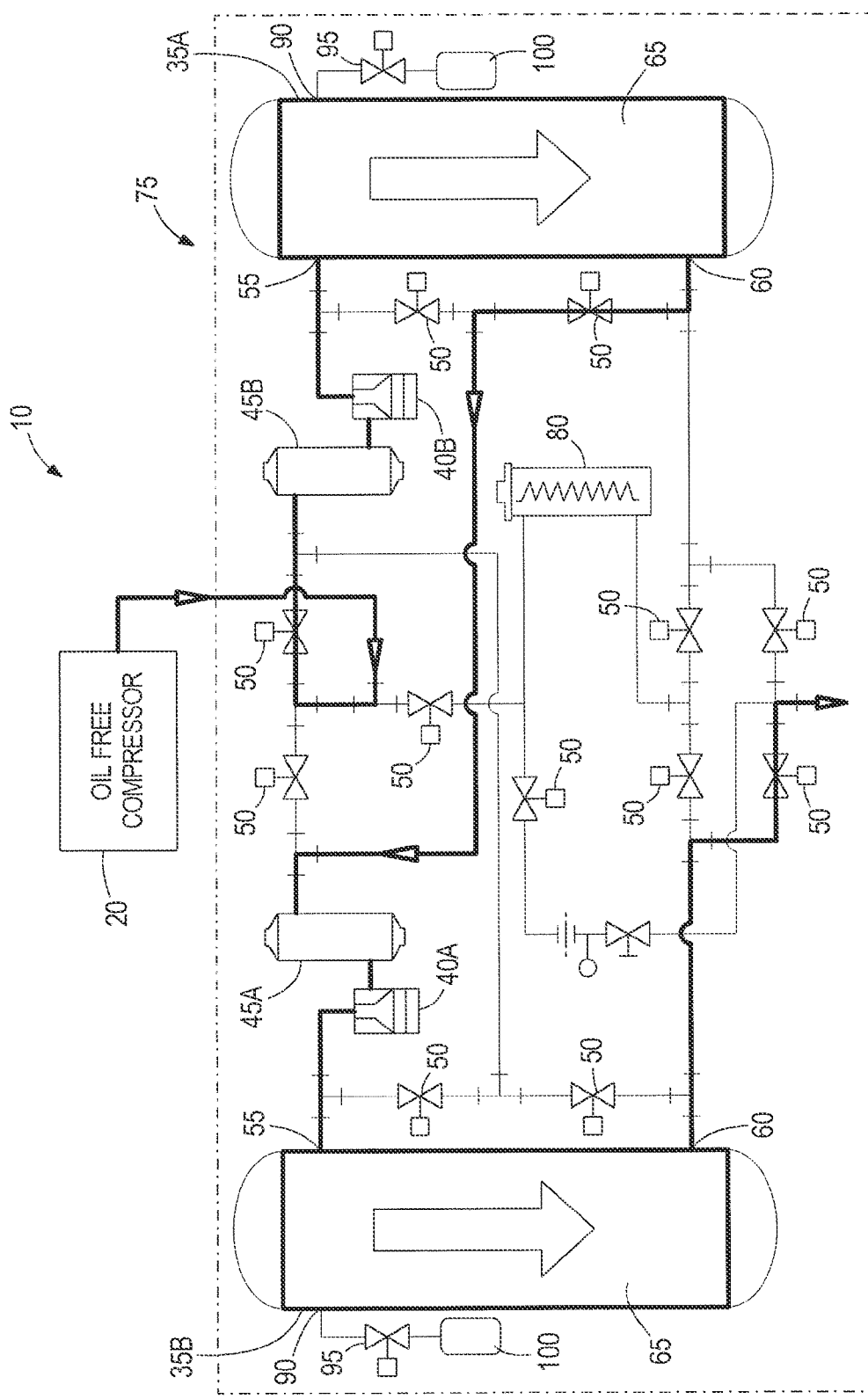
FIG. 4 is a schematic diagram of the compressor system and the heat of compression dryer system of FIG. 3 in a second mode of operation.

FIGS. 3 and 4 illustrate operation of the system 75 in much the same way as is illustrated in FIGS. 1 and 2 with the exception that the flow of hot moist compressed gas 25 passes through the heater 80 before entering the outlet 60 of the first tower 35A for regeneration. In the operating mode illustrated in FIG. 3, the heater 80 is not activated but rather is simply passed through.

Figure 5:
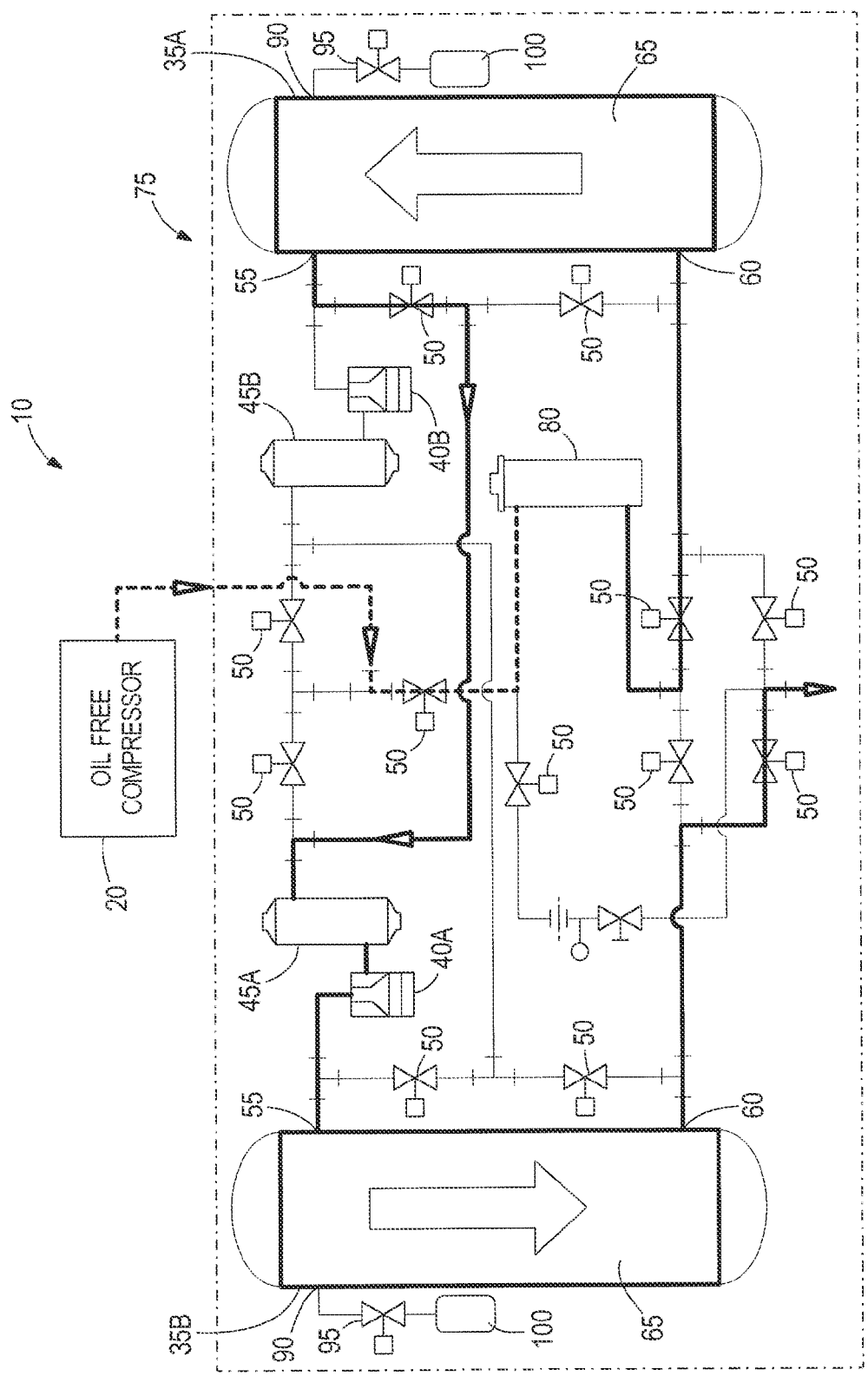
FIG. 5 is a schematic diagram of the compressor system and the heat of compression dryer system of FIG. 3 in a third mode of operation.

FIG. 5 illustrates operation of the system in a mode identical to that of FIG. 3 with the exception that the heater 80 is activated to further heat the compressed gas 25. The hotter compressed gas allows for faster more efficient regeneration of the desiccant 65 in the first tower 35A.

Figure 6:
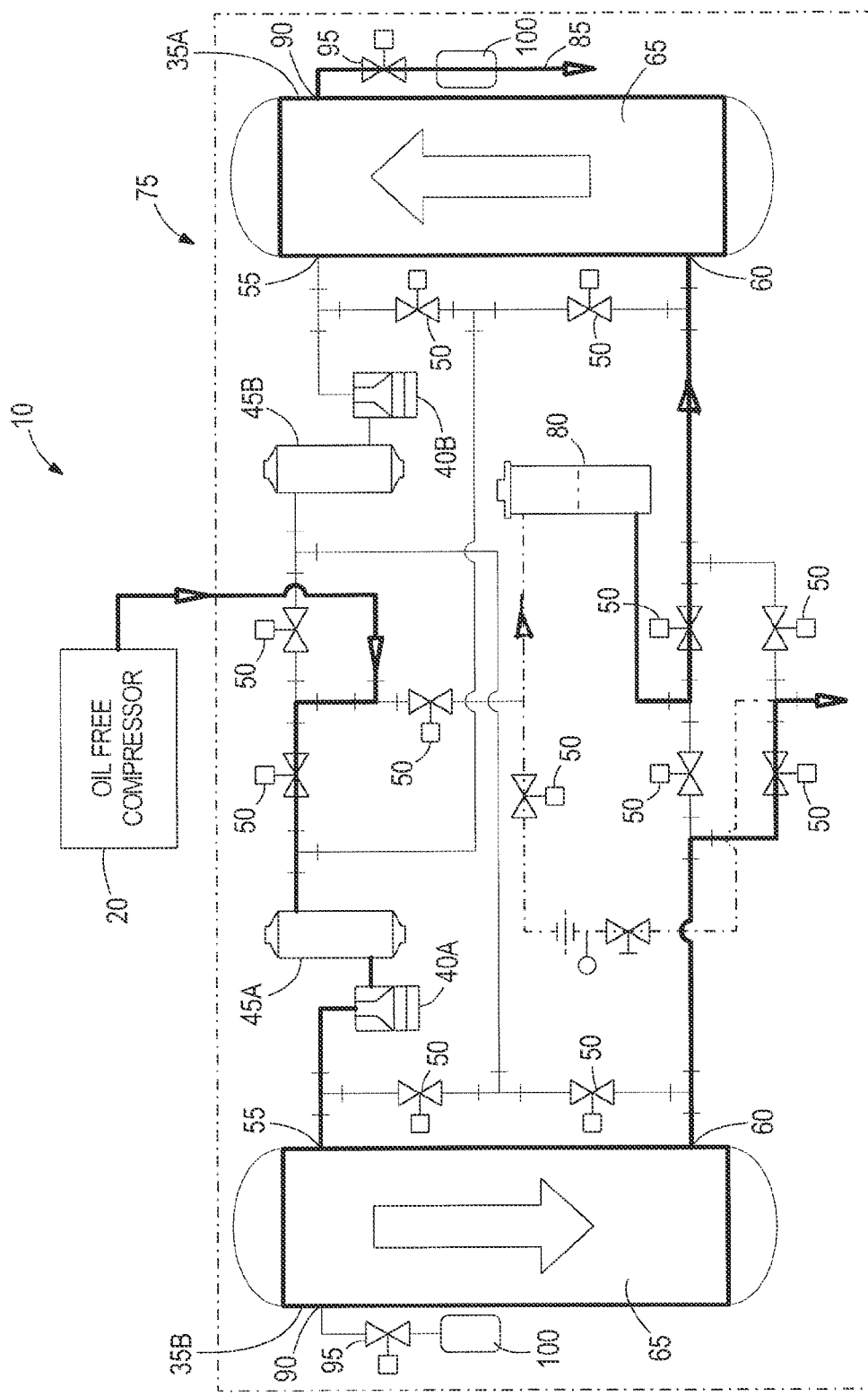
FIG. 6 is a schematic diagram of the compressor system and the heat of compression dryer system of FIG. 3 in a fourth mode of operation.

During the normal operating mode, regeneration is performed without depressurizing the desiccant tower. FIG. 6 illustrates a heated purge regeneration mode of operation that may be employed in some embodiments. The heated purge mode is employed as a backup mode to facilitate regeneration during low compressed air flow conditions which are not sufficient to adequately regenerate the desiccant. This mode entails de-pressurization of the regeneration tower 35A and utilizes a supplemental heater 80 to elevate the air temperature exiting from the drying tower 35B to purge the moisture from tower 35A. Similarly, when tower 35B is being regenerated, tower 35B is depressurized, and supplemental heater 80 is used to elevate the air temperature exiting from the drying tower 35A to purge the moisture from tower 35B. In the heated purge regeneration mode, moist compressed gas 25 enters the dryer system 75 and is directed to a cooler 45A where the gas is cooled. Moisture that condenses from the flow of compressed gas is separated in the moisture separator 40A downstream of the cooler 45A. The compressed gas is then directed to the second tower 35B and is further dried by the desiccant 65 within the tower 35B. The now dry compressed gas exits the tower 35B via the outlet 60 and flows out of the dryer system 75 to a point of use. A small portion of the dry compressed gas 85 is bled from a point downstream of the tower 35B and is directed to the heater 80. The heater 80 heats the bleed flow before the flow enters the first tower 35A via the tower outlet 60. The gas flows upward through the tower 35A to a discharge outlet 90. After exiting the discharge outlet 90, the flow passes through a valve 95 and a sound suppressing device 100 before being discharged to the atmosphere. In this arrangement, a small portion of the compressed gas flows through the tower 35A to perform the desired regeneration.

As one of ordinary skill in the art will realize, each mode of operation has been described with one tower 35 operating as the drying tower. However, each system can be operated in the mirror image of that illustrated such that the other of the towers 35 operates to dry the compressed gas. The switch between the mirror images and the various modes can occur automatically and seamlessly such that there is no spike in the dew point of the compressed air and without a disruption or interruption in the flow of dry compressed air 30 to the point of use through the use of a controller.

A typical cycle could incorporate about 2.5 hours of heating and about 1.5 hours of cooling for a total duration of about 4 hours per tower 35, and about 8 hours total. The required duration for the cycle functions and the total cycle length can be varied by changing the amount of desiccant 65 or the size of the towers 35. A controller 110 can be used to switch the valves 50 on a time basis. A more sophisticated controller 110 could use system temperatures and compare them to ambient temperature to evaluate the adequacy of regeneration and cooling and when function switching should take place.

The configuration illustrated in FIGS. 1 and 2 of two towers 35, ten valves 50, two coolers 45 and inter-connecting pipes permits the correct paths to be established with only three valve transits, thereby producing only a small pressure drop. Other configurations may require 4 to 6 or more valve transits to achieve the same functions. Low pressure drop is a desirable attribute for adsorption dryers as it is a significant contributor to the cost of operation. Some alternative configurations for accomplishing these functions utilize four-way valves and require 6 valve transits. Other configurations that accomplish the same flow functions require twelve two-way valves and have six or more valve transits.

Figure 7:
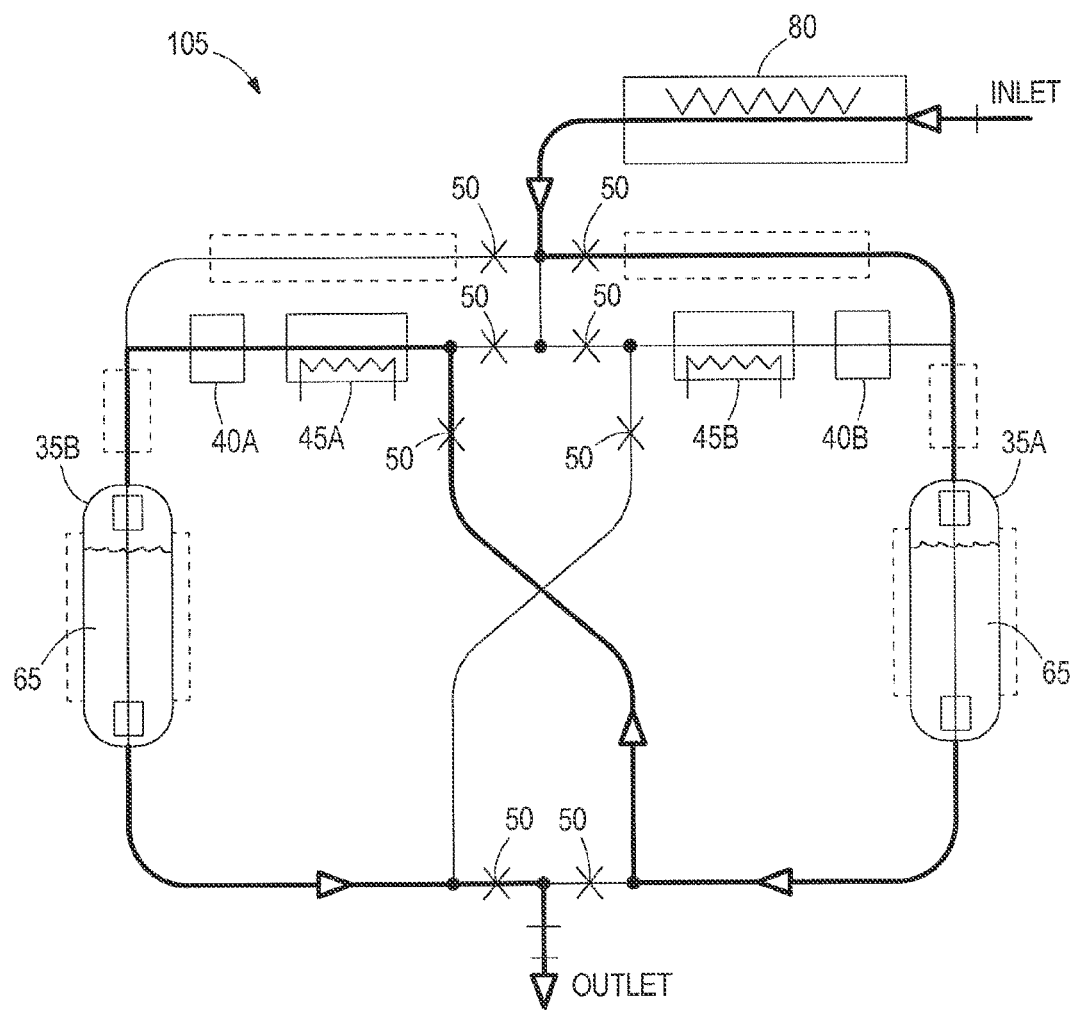
FIG. 7 is a schematic diagram of a compressor system and a third heat of compression dryer system in a first mode of operation.

The simplest configuration for a heat of compression dryer 105 has two towers 35A, 35B, eight valves 50 and a single cooler 45. A construction similar to the eight valve configuration but including two coolers 45 is illustrated in FIG. 7. In this configuration, there is no possibility to pre-cool the regenerating tower 35A prior to switching the tower 35A into drying mode which is one reason why the 10 valve configuration of FIG. 1 is preferred. This causes the air that is to be dried to first absorb the very high heat in the desiccant media 65 that is left from the regeneration process and to carry the heat out of the dryer 105. The temperature spike is accompanied by a dew point spike, as extremely hot desiccant 65 cannot adsorb moisture from the air. Both the high outlet temperature and the high dew point can adversely affect downstream equipment and processes and are therefore undesirable attributes. Specifically, in FIG. 7, the flow enters the dryer 105 and first passes through an optional boost heater 80. The flow then passes through the right-hand tower 35A to regenerate the right-hand tower 35A. Upon exiting the right-hand tower 35A the flow passes through the left-hand cooler 45A, the left-hand moisture separator 40A and the left hand desiccant tower 35B to dry the flow of compressed gas. The dry compressed gas 30 then exits the dryer system 105. Of course, as with the other constructions, the mirror image arrangement of flow in FIG. 7 provides for the regeneration of the left-hand tower 35B and the use of the right-hand tower 35A to dry the flow of compressed gas.

For part load operation in multistage compressors 20, accomplished by loading and unloading the air compressor 20 in a cyclic fashion, current dryer configurations exhibit deteriorating (increasing) outlet dew point temperatures. This is partly because, without hot airflow to bring heat into the intercooler, continued cooling airflow or continued cooling water flow carries off the heat from the mass of the cooler. When flow is restored, the exit temperature from the intercooler is first very low, rising over time, causing the average temperature from the compressor 20 to be much lower than that experienced at continuous (full) flow, thereby resulting in lower regeneration heating temperature, and a consequential reduction in dew point performance. By controlling the flow of cooling media in the intercooler, or by controlled bypass of a portion of hot air from the cooler inlet to the cooler outlet, it is possible to increase the average temperature at the inlet of the final compressor stage, and thus to increase the heat and average temperature available at the compression stage outlet for regeneration of the desiccant, thereby improving the dew point performance of the dryer system. The hot air bypass system is preferable for it's faster speed of response and higher achievable average temperature.

Figure 8:
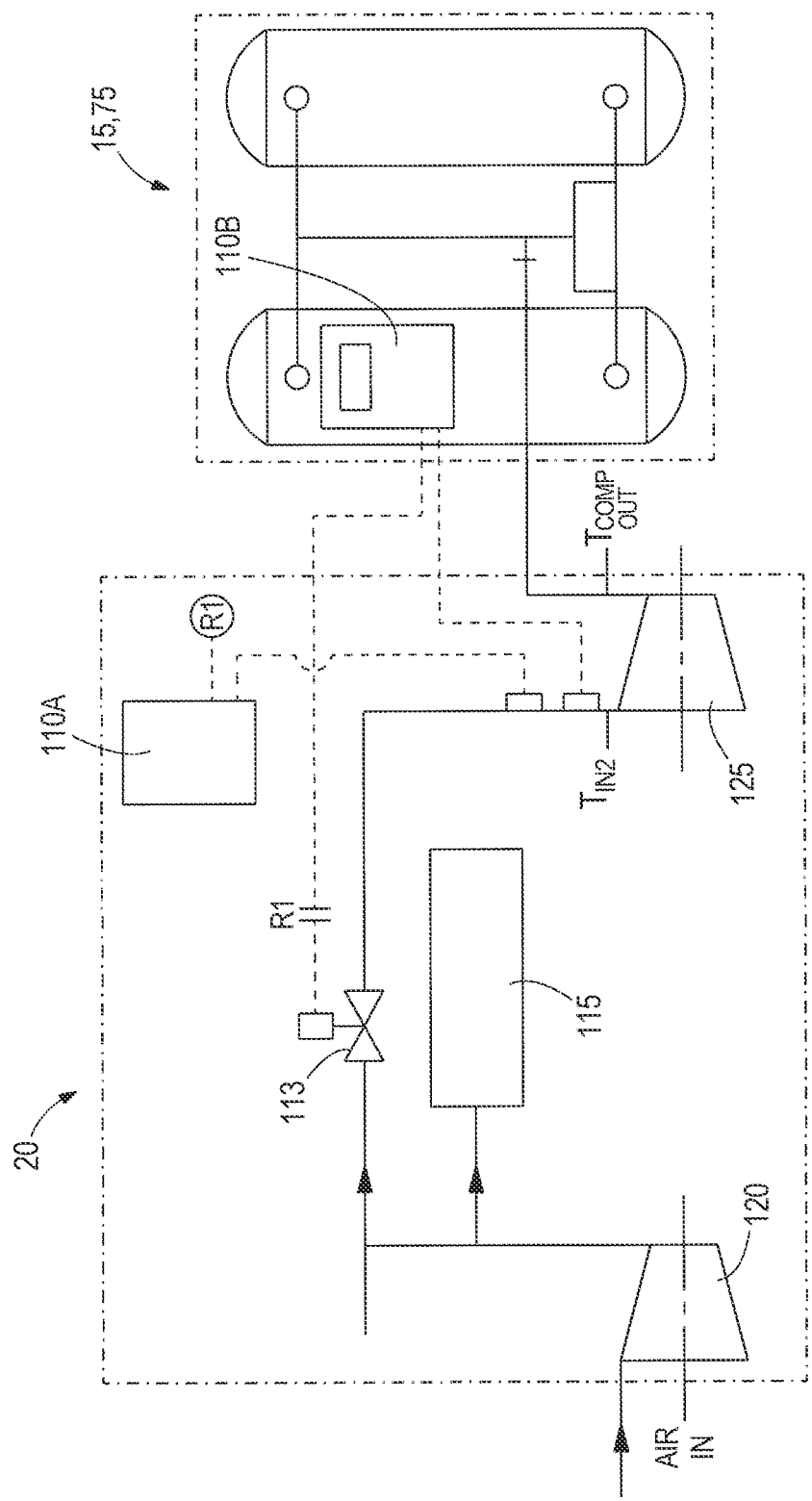
FIG. 8 is a schematic illustration of a multi-stage compression system including a heat of compression dryer system.

A simple controller 110 could control the cooling media flow to an intercooler 115 when the compressor flow is interrupted (unloaded), then restore the cooling media flow when the compressed air flow is restored (loaded). This retains the heat contained in the mass of the cooler and cooling media, and thus does not cool the intercooler. A more sophisticated controller 110 could control the flow rate of the cooling media, in order to create a desired outlet temperature, or at least maintain the temperature above a predetermined temperature from the cooler, and thus (indirectly) a desired outlet temperature from the compressor 20 permitting outlet dew point performance to be improved at both full and part loads. The proposed control method works for continuous flow variable speed compressors 20 also, as at reduced airflow the intercooler outlet temperature more closely approaches the cooling medium temperature, and heat transfer losses in piping increase (relatively) causing the outlet dew point to be reduced. A more direct means of controlling the inlet temperature to the following compression stage is illustrated in FIG. 8 and includes a bypass valve 113 that bypasses a fraction of the hot discharge air from a first stage compressor 120 and mixes it with air which has gone through the intercooler 115 to achieve the desired elevated inlet temperature to a following compression stage 125, thereby elevating the discharge temperature of the compressor 20. In an optimal configuration, both the water temperature and the air temperature could be controlled to achieve the best system response.

As one of ordinary skill in the art will realize, a superior system can be achieved if the compressor control 110A and the dryer control 110B are integrated to closely control the outlet temperature of the air exiting the compressor 20 while also controlling the operating parameters of the dryer system.

The device obtains superior outlet dew point performance by a simple flow path with a minimum number of components; and by incorporating control of the compressor intercooler stage to further enhance performance when the compressor 20 is operating in the load/unload, or variable speed reduced flow mode. When towers 35 are switched there is little or no temperature or dew point spike.

Thus, the invention provides, among other things, an absorption dryer system that is continuously operable without a temperature or dew point spike.

What is claimed is:

1. A gas compressing system comprising:
a compressor operable to provide a flow of compressed gas and water vapor;
a first desiccant tower including a first quantity of desiccant;
a second desiccant tower separate from the first desiccant tower and including a second quantity of desiccant;
a first moisture separator;
a second moisture separator separate from the first moisture separator;
a dry gas outlet;
a first set of no more than three valves each movable between an open position and a closed position; and
a second set of no more than three valves each movable between an open position and a closed position, wherein the flow of compressed gas and water vapor flows along a flow path in order from the compressor to the first desiccant tower, to the first moisture separator, to the second desiccant tower and out the dry gas outlet when each of the valves of the first set of valves is open and each valve of the second set of valves is closed, and wherein the flow of compressed gas and water vapor flows in order from the compressor to the second desiccant tower, to the second moisture separator, to the first desiccant tower and out the dry gas outlet when each of the valves of the first set of valves is closed and each valve of the second set of valves is opened.

2. The gas compressing system of claim 1, wherein the first desiccant tower includes a first inlet and a first outlet, and wherein the flow of compressed gas and water vapor flows through the first desiccant tower from the outlet to the inlet when the valves of the first set of valves are in the open position and the valves of the second set of valves are in the closed position.

3. The gas compressing system of claim 2, wherein the flow of compressed gas and water vapor flows through the first desiccant tower from the inlet to the outlet when the valves of the first set of valves are in the closed position and the valves of the second set of valves are in the open position.

4. The gas compressing system of claim 1, wherein each valve of the first set of valves moves substantially simultaneously between the open position and the closed position.

5. The gas compressing system of claim 4, wherein each valve of the first set of valves are either simultaneously in the open position or the closed position.

6. The gas compressing system of claim 5, wherein each valve of the second set of valves are either simultaneously in the open position or the closed position, and wherein when the first set of valves are in the open position, the second set of valves are in the closed position.

7. The gas compressing system of claim 1, wherein the first set of valves includes three and only three valves and the second set of valves includes three and only three valves.

8. The gas compressing system of claim 1, further comprising an additional valve and a heater positioned within the flow path between the compressor and the first desiccant tower, wherein the heater is operable to heat the flow of compressed gas and water vapor when the additional valve is open.

9. The gas compressing system of claim 1, further comprising a first cooler positioned in the flow path between the first desiccant tower and the first moisture separator when each of the valves of the first set of valves is open and each valve of the second set of valves is closed.

10. The gas compressing system of claim 9, further comprising a second cooler positioned in the flow path between the second desiccant tower and the second moisture separator when each of the valves of the first set of valves is closed and each valve of the second set of valves is opened.

11. The gas compressing system of claim 1, wherein the compressor is a multi-stage compressor including a final stage and an intercooler upstream of the final stage and operable to cool the flow of compressed gas to an intercooler discharge temperature before it enters the final stage, and wherein a controller is operable to maintain the intercooler discharge temperature above a predetermined temperature.

12. A gas compressing system comprising:
a compressor operable to provide a flow of compressed gas and water vapor;
a first desiccant tower including a first inlet, a first outlet, and a first quantity of desiccant positioned in a first flow path between the first inlet and the first outlet;

a second desiccant tower including a second inlet, a second outlet, and a second quantity of desiccant positioned in a second flow path between the second inlet and the second outlet;

a first moisture separator;

a second moisture separator;

a dry gas outlet;

a first set of three and only three valves each movable between an open position and a closed position; and a second set of three and only three valves each movable between an open position and a closed position, wherein in a first arrangement, each of the valves of the first set of valves is open and each of the valves of the second set of valves is closed and the flow of compressed gas and vapor flows along a flow path from the compressor, through the first desiccant tower to heat and regenerate the first quantity of desiccant, then through the first moisture separator to remove a portion of the water vapor, then through the second desiccant tower to remove additional water vapor, then through the dry gas outlet, and wherein in a second arrangement, each of the valves of the first set of valves is closed and each of the valves of the second set of valves is open and the flow of compressed gas and vapor flows from the compressor, through the second desiccant tower to heat and regenerate the second quantity of desiccant, then through the second moisture separator to remove a portion of the water vapor, then through the first desiccant tower to remove additional water vapor, then through the dry gas outlet.

13. The gas compressing system of claim 12, wherein the flow of compressed gas and water vapor flows through the first desiccant tower from the outlet to the inlet when the valves of the first set of valves are in the open position and the valves of the second set of valves are in the closed position.

14. The gas compressing system of claim 13, wherein the flow of compressed gas and water vapor flows through the first desiccant tower from the inlet to the outlet when the valves of the first set of valves are in the closed position and the valves of the second set of valves are in the open position.

15. The gas compressing system of claim 12, wherein each valve of the first set of valves moves substantially simultaneously between the open position and the closed position.

16. The gas compressing system of claim 15, wherein each valve of the first set of valves are either simultaneously in the open position or the closed position.

17. The gas compressing system of claim 16, wherein each valve of the second set of valves are either simultaneously in the open position or the closed position, and wherein when the first set of valves are in the open position, the second set of valves are in the closed position.

18. The gas compressing system of claim 12, further comprising a heater positioned within the flow path between the compressor and the first desiccant tower and is operable to heat the flow of compressed gas and water vapor.

19. The gas compressing system of claim 12, further comprising a first cooler positioned in the flow path between the first desiccant tower and the first moisture separator when each of the valves of the first set of valves is open and each valve of the second set of valves is closed.

20. The gas compressing system of claim 19, further comprising a second cooler positioned in the flow path between the second desiccant tower and the second moisture separator when each of the valves of the first set of valves is closed and each valve of the second set of valves is opened.

21. The gas compressing system of claim 9, wherein the compressor is a multi-stage compressor including a final stage and an intercooler upstream of the final stage and operable to cool the flow of compressed gas to an intercooler discharge temperature before it enters the final stage, and wherein a controller is operable to maintain the intercooler discharge temperature above a predetermined temperature.

22. A method of providing dry compressed gas at a dry gas outlet, the method comprising:

providing a first desiccant tower and a second desiccant tower, each tower including an inlet and an outlet;

operating a compressor to compress a quantity of gas to produce a flow of compressed gas and water vapor at a high temperature;

passing the flow of compressed gas and water vapor along a flow path through the first desiccant tower from the outlet to the inlet to cool the flow of compressed gas and water vapor;

regenerating desiccant in the first desiccant tower as the flow of compressed gas and water vapor passes therethrough;

passing the flow of compressed gas and water vapor through the second desiccant tower from the inlet to the outlet, the desiccant in the second desiccant tower adsorbing a portion of the water vapor from the flow of compressed gas and water vapor;

directing the flow of compressed gas and water vapor from the outlet of the second desiccant tower to the dry gas outlet;

periodically transitioning a first group of no more than three valves from an open position to a closed position and a second group of no more than three valves from a closed position to an open position to redirect the flow of compressed gas and water vapor from the compressor to the outlet of the second desiccant tower to regenerate desiccant in the second desiccant tower, from the inlet of the second desiccant tower to the inlet of the first desiccant tower to remove a portion of the water vapor from the flow of compressed gas and water vapor, and from the outlet of the first desiccant tower to the dry gas outlet.

23. The method of claim 22, further comprising separating a quantity of water from the flow of compressed gas and water vapor in a moisture separator positioned in the flow path between the first desiccant tower and the second desiccant tower.

24. The method of claim 22, wherein the periodically transitioning step includes substantially simultaneously closing each of the no more than three valves of the first group of valves and opening each of the no more than three valves of the second group of valves.

25. The method of claim 22, further comprising heating the flow of compressed gas and water vapor before it enters the first desiccant tower.

26. The method of claim 22, wherein the first group of valves includes three and only three separate and distinct valves and the second group of valves includes three and only three separate and distinct valves.

27. The method of claim 22, wherein the gas is subject to only three valve transits between the compressor and the dry gas outlet.

28. The method of claim 22, wherein the regenerating of the desiccant in the first desiccant tower is performed without depressurizing the first desiccant tower; and wherein the second desiccant tower is regenerated without depressurizing the second desiccant tower.

29. The method of claim 22, further comprising boosting the regeneration air temperature using a supplemental heater and an additional valve transit.

* * * * *